US009676909B2

(12) United States Patent
Wlassics et al.

(10) Patent No.: US 9,676,909 B2
(45) Date of Patent: Jun. 13, 2017

(54) HYDROPHILIC FLUOROPOLYMER

(71) Applicant: SOLVAY SPECIALTY POLYMERS ITALY S.P.A., Bollate (IT)

(72) Inventors: Ivan Wlassics, Garessio (IT); Roberto Biancardi, Bellinzago Lombardo (IT); Pasquale Campanelli, Calimera (JP); Emanuele Di Nicolo', Paderno Dugnano (IT); Aldo Sanguineti, Milan (IT); Claudio Adolfo Pietro Tonelli, Paderno d'Adda (IT)

(73) Assignee: SOLVAY SPECIALTY POLYMERS ITALY S.P.A., Bollate (Milan) (IT)

( * ) Notice: Subject to any disclaimer, the term of this patent is extended or adjusted under 35 U.S.C. 154(b) by 0 days.

(21) Appl. No.: 14/653,406

(22) PCT Filed: Dec. 17, 2013

(86) PCT No.: PCT/EP2013/076952
§ 371 (c)(1),
(2) Date: Jun. 18, 2015

(87) PCT Pub. No.: WO2014/095902
PCT Pub. Date: Jun. 26, 2014

(65) Prior Publication Data
US 2016/0002413 A1  Jan. 7, 2016

(30) Foreign Application Priority Data
Dec. 21, 2012  (EP) .................... 12199205

(51) Int. Cl.
C08L 63/00     (2006.01)
C08G 81/02     (2006.01)
C08F 214/22    (2006.01)
C08G 65/00     (2006.01)
C08L 71/00     (2006.01)
B01D 67/00     (2006.01)

(52) U.S. Cl.
CPC ....... *C08G 81/025* (2013.01); *B01D 67/0023* (2013.01); *C08F 214/22* (2013.01); *C08F 214/225* (2013.01); *C08G 65/007* (2013.01); *C08L 63/00* (2013.01); *C08L 71/00* (2013.01); *C08G 2261/128* (2013.01); *C08G 2650/48* (2013.01); *C08L 2205/05* (2013.01)

(58) Field of Classification Search
None
See application file for complete search history.

(56) References Cited

U.S. PATENT DOCUMENTS

| | | | | |
|---|---|---|---|---|
| 5,043,390 A * | 8/1991 | Koishi | ................. | C08F 210/00 525/200 |
| 5,434,229 A * | 7/1995 | Abusleme | ............... | C08F 14/18 526/207 |
| 6,107,393 A * | 8/2000 | Abusleme | ............ | C08F 210/02 524/545 |
| 6,277,937 B1 * | 8/2001 | Duvalsaint | ............. | C08F 14/22 526/250 |
| 6,303,675 B1 * | 10/2001 | Kobayashi | ............. | C08G 77/24 524/261 |
| 6,509,073 B1 * | 1/2003 | Arcella | ................ | C08K 5/0025 138/137 |
| 6,569,946 B2 * | 5/2003 | Abusleme | ............ | C08F 255/02 525/192 |
| 2007/0219322 A1 | 9/2007 | Mayes et al. | | |
| 2008/0205950 A1 * | 8/2008 | Moorlag | ................... | C08F 8/42 399/333 |
| 2009/0191357 A1 * | 7/2009 | Moore | ............... | B01D 67/0093 427/551 |
| 2014/0378569 A1 * | 12/2014 | Abusleme | .......... | C08G 18/7621 521/145 |

FOREIGN PATENT DOCUMENTS

| | | |
|---|---|---|
| CN | 102218273 A | 10/2011 |
| EP | 1930385 A1 | 6/2008 |
| WO | 2008129041 A1 | 10/2008 |
| WO | 2011015517 A1 | 2/2011 |
| WO | 2012084580 A1 | 6/2012 |
| WO | 2012175416 A1 | 12/2012 |

OTHER PUBLICATIONS

Smolders K. et al., "Terminology for membrane distillation", Desalination, 1989, 72, p. 249-262—Elsevier Science Publishers B.V., Amsterdam.

* cited by examiner

*Primary Examiner* — Robert S Loewe

(57) ABSTRACT

The present invention pertains to a process for the manufacture of a grafted fluoropolymer [polymer (Fg)], said process comprising reacting: A) at least one fluoropolymer comprising at least one functional group selected from the group consisting of a hydroxyl group and a carboxylic acid group [polymer (F)], B) at least one polyoxyalkylene (POA) of formula (I): $R_B$—$(CH_2$—$O)_x$—$(CH_2CHR_4O)_n$—$(CH_2$—$O)_{x'}$—$R_C$, wherein at least one of $R_B$ and $R_C$ is a reactive group comprising at least one heteroatom selected from oxygen and nitrogen different from the hydroxyl group, the remaining, if any, being a —$[O]_z$—$CH_3$ alkyl group, wherein z is 0 or 1, $R_4$ is a hydrogen atom or a $C_1$-$C_5$ alkyl group, x and x', equal to or different from each other, are independently 0 or 1, and n is an integer comprised between 2 and 1000, preferably between 5 and 200, C) optionally, in the presence of at least one catalyst, and D) optionally, in the presence of at least one organic solvent (S). The present invention also pertains to grafted fluoropolymers obtained from said process and to uses of said grafted fluoropolymers for manufacturing porous membranes.

20 Claims, No Drawings

HYDROPHILIC FLUOROPOLYMER

This application is a U.S. national stage entry under 35 U.S.C. X371 of International Application No. PCT/EP2013/076952 filed Dec. 17, 2013, which claims priority to European application No. 12199205.1 filed on Dec. 21, 2012, the whole content of this application being incorporated herein by reference for all purposes. The entire contents of these applications are explicitly incorporated herein by this reference.

TECHNICAL FIELD

The present invention pertains to grafted fluoropolymers, to a process for their manufacture and to uses of said grafted fluoropolymers for manufacturing porous membranes.

BACKGROUND ART

Polyvinylidene fluoride (PVDF) is widely used in the preparation of microfiltration and ultrafiltration membranes due to its good thermal stability, chemical resistance, excellent processability and convenience in controlling the porosity and the morphology. However, applications of these membranes for water purification have been limited due to the hydrophobic nature of PVDF, where fouling occurs on membrane's surfaces and pores.

A variety of constituents in water can lead to membrane fouling, including dissolved inorganic or organic compounds, colloids, bacteria and suspended solids. Biofouling is largely attributable to accumulated extracellular materials, rather than individual bacterial cells or microbial flocs. These extracellular materials, including soluble microbial products and extracellular polymeric substances, consist mainly of polysaccharides, proteins and natural organic matter.

In recent years, hydrophilic microfiltration and ultrafiltration membranes prepared from chemically or physically modified PVDF have been widely studied and reported. Several approaches have been developed to endow the membranes with hydrophylic properties, such as surface coating and surface grafting.

For instance, WO 2012/175416 (SOLVAY SPECIALTY POLYMERS ITALY S.P.A.) Dec. 27, 2012 discloses a process for the manufacture of porous membranes, said process comprising providing a composition comprising at least one fluoropolymer, said fluoropolymer comprising recurring units derived from at least one (meth)acrylic monomer, and at least one poly(alkylene oxide). The poly (alkylene oxide) has a number average molecular weight typically comprised between 100000 and 5000000.

Also, US 2007/0219322 (MASSACHUSETTS INSTITUTE OF TECHNOLOGY) Sep. 20, 2007 discloses a process for the manufacture of graft copolymers via a controlled free-radical process by grafting hydrophilic chains onto polymers, particularly hydrophobic polymers such as polyvinyl chloride), PVDF and chlorinated polypropylene. The hydrophilic chain can comprise a poly(ethylene oxide). Membranes for water filtration can be prepared from the graft copolymers thereby provided.

Nevertheless, coating or surface grafting directly on a membrane has some shortcomings. For example, a coated surface layer that is physically absorbed on the membrane's surface can be easily washed off and surface grafting of membranes is likely to be accompanied by changes in membrane pore size and distribution, which results in reduced permeability.

SUMMARY OF INVENTION

It is thus an object of the present invention a process for the manufacture of a grafted fluoropolymer [polymer (Fg)], said process comprising reacting:
(A) at least one fluoropolymer comprising at least one functional group selected from the group consisting of a hydroxyl group and a carboxylic acid group [polymer (F)],
(B) at least one polyoxyalkylene (POA) of formula (I):

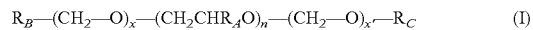

$$R_B-(CH_2-O)_x-(CH_2CHR_4O)_n-(CH_2-O)_{x'}-R_C \quad (I)$$

wherein at least one of $R_B$ and $R_C$ is a reactive group comprising at least one heteroatom selected from oxygen and nitrogen different from the hydroxyl group, the remaining, if any, being a $-[O]_z-CH_3$ alkyl group, wherein z is 0 or 1, $R_A$ is a hydrogen atom or a $C_1$-$C_5$ alkyl group, x and x', equal to or different from each other, are independently 0 or 1, and n is an integer comprised between 2 and 1000, preferably between 5 and 200,
(C) optionally, in the presence of at least one catalyst, and
(D) optionally, in the presence of at least one organic solvent (S).

It is also an object of the present invention a fluoropolymer composition [composition (F)] comprising at least one grafted fluoropolymer [polymer (Fg)] obtainable by the process of the invention, said polymer (Fg) comprising:
at least one fluorinated backbone, and
at least one pendant side chain linked to one or two fluorinated backbones of the polymer (Fg) through one or two functional groups, said pendant side chain having formula:

$$-[X]_y-(CH_2O)_x-(CH_2CHR_4O)_{n'}-(CH_2O)_{x'}-[X']_{y'}-$$

wherein X and X', equal to or different from each other, are independently bridging groups comprising at least one heteroatom selected from oxygen and nitrogen, $R_A$ is a hydrogen atom or a $C_1$-$C_5$ alkyl group, x and x', equal to or different from each other, are independently 0 or 1, y and y', equal to or different from each other, are independently 0 or 1, and n' is an integer comprised between 2 and 1000, preferably between 5 and 200.

The Applicant has surprisingly found that the grafted fluoropolymer of the present invention is endowed with outstanding hydrophilic properties to be suitably used for manufacturing porous membranes such as antifouling membranes for water purification.

It is thus also an object of the present invention a process for the manufacture of a porous membrane, said process comprising, preferably consisting of the following steps:
(1) providing the composition (F) comprising at least one polymer (Fg) as defined above,
(2) processing said composition (F) thereby providing a fluoropolymer film, and
(3) processing the fluoropolymer film provided in step (2) thereby providing a porous membrane.

The composition (F) of the invention typically comprises:
(i) at least one polymer (Fg) as defined above,
(iii) optionally, residual amounts of at least one polymer (F) as defined above, and
(iv) optionally, residual amounts of at least one polyoxyalkylene (POA) of formula (I) as defined above.

By the term "fluoropolymer", it is hereby intended to denote a polymer comprising recurring units derived from at least one fluorinated monomer.

By the term "fluorinated monomer", it is hereby intended to denote an ethylenically unsaturated monomer comprising at least one fluorine atom.

The polymer (F) typically comprises recurring units derived from at least one fluorinated monomer and from at least one hydrogenated monomer comprising at least one functional group selected from the group consisting of a hydroxyl group and a carboxylic acid group [monomer (H)].

By the term "hydrogenated monomer", it is hereby intended to denote an ethylenically unsaturated monomer comprising at least one hydrogen atom and free from fluorine atoms.

The term "at least one fluorinated monomer" is understood to mean that the polymer (F) may comprise recurring units derived from one or more than one fluorinated monomers. In the rest of the text, the expression "fluorinated monomers" is understood, for the purposes of the present invention, both in the plural and the singular, that is to say that they denote both one or more than one fluorinated monomers as defined above.

The term "at least one monomer (H)" is understood to mean that the polymer (F) may comprise recurring units derived from one or more than one monomers (H) as defined above. In the rest of the text, the expression "monomer (H)" is understood, for the purposes of the present invention, both in the plural and the singular, that is to say that they denote both one or more than one monomers (H) as defined above.

It is understood, for the purposes of the present invention, that the polymer (F) typically comprises at least one fluorinated backbone and at least one functional group selected from the group consisting of a hydroxyl group and a carboxylic acid group.

The polymer (F) comprises preferably at least 0.01% by moles, more preferably at least 0.05% by moles, even more preferably at least 0.1% by moles of recurring units derived from at least one monomer (H) as defined above.

The polymer (F) comprises preferably at most 20% by moles, more preferably at most 15% by moles, even more preferably at most 10% by moles, most preferably at most 3% by moles of recurring units derived from at least one monomer (H) as defined above.

Determination of the average mole percentage of monomer (H) recurring units in polymer (F) can be performed by any suitable method. Mention can be notably made of acid-base titration methods, well suited e.g. for the determination of the acrylic acid content, of NMR methods, adequate for the quantification of monomers (H) comprising aliphatic hydrogen atoms in side chains, of weight balance based on total fed monomer (H) and unreacted residual monomer (H) during polymer (F) manufacture.

The monomer (H) is preferably a (meth)acrylic monomer [monomer (MA)] of formula (II):

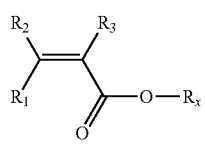

(II)

wherein:
$R_1$, $R_2$ and $R_3$, equal to or different from each other, are independently selected from a hydrogen atom and a $C_1$-$C_3$ hydrocarbon group, and $R_x$ is a hydrogen atom or a $C_1$-$C_5$ hydrocarbon group comprising at least one hydroxyl group.

Should the polymer (F) comprise recurring units derived from at least one fluorinated monomer and from at least one (meth)acrylic monomer [monomer (MA)] of formula (II) as defined above, said polymer (F) typically comprises at least one fluorinated backbone and at least one functional group of formula —C(O)—O—$R_x$, wherein $R_x$ is a hydrogen atom or a $C_1$-$C_5$ hydrocarbon group comprising at least one hydroxyl group.

The monomer (MA) preferably complies with formula (II-A) here below:

(II-A)

wherein:
$R'_1$, $R'_2$ and $R'_3$ are hydrogen atoms, and
$R'_x$ is a hydrogen atom or a $C_1$-$C_5$ hydrocarbon group comprising at least one hydroxyl group.

Non-limitative examples of suitable monomers (MA) include, notably, acrylic acid, methacrylic acid, hydroxyethyl(meth)acrylate, hydroxypropyl(meth)acrylate, hydroxyethylhexyl(meth)acrylate.

The monomer (MA) is even more preferably selected from the followings:

hydroxyethyl acrylate (HEA) of formula:

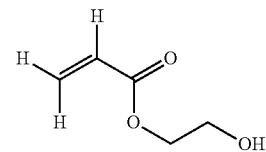

2-hydroxypropyl acrylate (HPA) of either of formulae:

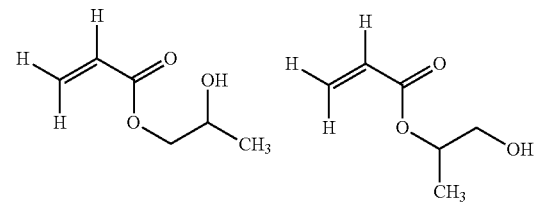

acrylic acid (AA) of formula:

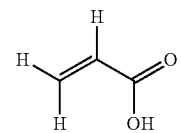

and mixtures thereof.

The monomer (MA) is even more preferably acrylic acid (AA) or hydroxyethyl acrylate (HEA).

Non limitative examples of suitable fluorinated monomers include, notably, the followings:

$C_3$-$C_6$ perfluoroolefins, such as tetrafluoroethylene, and hexafluoropropene;

$C_2$-$C_8$ hydrogenated fluoroolefins, such as vinylidene fluoride, vinyl fluoride, 1,2-difluoroethylene and trifluoroethylene;

perfluoroalkylethylenes complying with formula $CH_2=CH-R_{f0}$, in which $R_{f0}$ is a $C_1$-$C_6$ perfluoroalkyl;

chloro- and/or bromo- and/or iodo-$C_2$-$C_6$ fluoroolefins, like chlorotrifluoroethylene;

(per)fluoroalkylvinylethers complying with formula $CF_2=CFOR_{f1}$ in which $R_{f1}$ is a $C_1$-$C_6$ fluoro- or perfluoroalkyl, e.g. $CF_3$, $C_2F_5$, $C_3F_7$;

$CF_2=CFOX_0$ (per)fluoro-oxyalkylvinylethers, in which $X_0$ is a $C_1$-$C_{12}$ alkyl, or a $C_1$-$C_{12}$ oxyalkyl, or a $C_1$-$C_{12}$ (per)fluorooxyalkyl having one or more ether groups, like perfluoro-2-propoxy-propyl;

(per)fluoroalkylvinylethers complying with formula $CF_2=CFOCF_2OR_{f2}$ in which $R_{f2}$ is a $C_1$-$C_6$ fluoro- or perfluoroalkyl, e.g. $CF_3$, $C_2F_5$, $C_3F_7$ or a $C_1$-$C_6$ (per)fluorooxyalkyl having one or more ether groups, like $-C_2F_5-O-CF_3$;

functional (per)fluoro-oxyalkylvinylethers complying with formula $CF_2=CFOY_0$, in which $Y_0$ is a $C_1$-$C_{12}$ alkyl or (per)fluoroalkyl, or a $C_1$-$C_{12}$ oxyalkyl, or a $C_1$-$C_{12}$ (per)fluorooxyalkyl having one or more ether groups and $Y_0$ comprising a carboxylic or sulfonic acid group, in its acid, acid halide or salt form;

fluorodioxoles, especially perfluorodioxoles.

The polymer (F) is preferably selected from the group consisting of:

a fluoropolymer [polymer ($F_1$)] comprising recurring units derived from vinylidene fluoride (VDF), from at least one monomer (MA) of formula (II) as defined above and, optionally, from one or more fluorinated monomers different from VDF, and a fluoropolymer [polymer ($F_2$)] comprising recurring units derived from at least one hydrogenated monomer selected from ethylene, propylene and isobutylene, from a fluorinated monomer selected from tetrafluoroethylene (TFE), chlorotrifluoroethylene (CTFE) and mixtures thereof, and from at least one monomer (MA) of formula (II) as defined above.

The polymer ($F_1$) preferably comprises:

(a') at least 60% by moles, preferably at least 75% by moles, more preferably at least 85% by moles of vinylidene fluoride (VDF);

(b') optionally, from 0.1% to 15% by moles, preferably from 0.1% to 12% by moles, more preferably from 0.1% to 10% by moles of a fluorinated monomer selected from vinylfluoride ($VF_1$), chlorotrifluoroethylene (CTFE), hexafluoropropene (HFP), tetrafluoroethylene (TFE), trifluoroethylene (TrFE), perfluoromethylvinylether (PMVE) and mixtures therefrom; and (c') from 0.01% to 20% by moles, preferably from 0.05% to 18% by moles, more preferably from 0.1% to 10% by moles of at least one monomer (MA) of formula (II) as defined above.

The polymer ($F_1$) can be manufactured by aqueous suspension polymerization or by aqueous emulsion polymerization processes. The polymer ($F_1$) is preferably manufactured by an aqueous suspension polymerization process as described in WO 2008/129041 (SOLVAY SOLEXIS S.P.A.) Oct. 30, 2008.

The polymer ($F_2$) typically has a molar ratio between hydrogenated monomer(s) and fluorinated monomer(s) ranging from 30:70 to 70:30. In polymers ($F_2$) as defined above, the hydrogenated monomer is preferably ethylene, optionally in combination with other hydrogenated monomers.

The polymer ($F_2$) preferably comprises:

(a) from 35% to 65% by moles, preferably from 45% to 55% by moles, more preferably from 48% to 52% by moles of ethylene (E);

(b) from 65% to 35% by moles, preferably from 55% to 45% by moles, more preferably from 52% to 48% by moles of at least one fluorinated monomer selected from chlorotrifluoroethylene (CTFE), tetrafluoroethylene (TFE) and mixtures thereof;

(c) from 0.01% to 20% by moles, preferably from 0.05% to 18% by moles, more preferably from 0.1% to 10% by moles of at least one monomer (MA) of formula (II) as defined above.

Polymers ($F_2$) wherein the fluorinated monomer is chlorotrifluoroethylene (CTFE) and the hydrogenated monomer is ethylene (E) will be identified herein below as ECTFE copolymers; polymers ($F_2$) wherein the fluorinated monomer is tetrafluoroethylene (TFE) and the hydrogenated monomer is ethylene (E) will be identified herein below as ETFE copolymers.

Among polymers ($F_2$), ECTFE polymers are preferred.

The polymer ($F_2$) can be manufactured by aqueous suspension polymerization or by aqueous emulsion polymerization processes.

The polymer (F) is more preferably selected from polymers ($F_1$).

The polyoxyalkylene (POA) of formula (I) as defined above is typically free from fluorine atoms.

The polyoxyalkylene (POA) of formula (I) as defined above is typically selected from the group consisting of:

a monofunctional POA of formula (I-A):

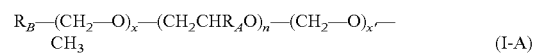
(I-A)

wherein $R_B$ is a reactive group comprising at least one heteroatom selected from oxygen and nitrogen different from the hydroxyl group, $R_A$ is a hydrogen atom or a $C_1$-$C_5$ alkyl group, x and x', equal to or different from each other, are independently 0 or 1, and n is an integer comprised between 2 and 1000, preferably between 5 and 200, and a difunctional POA of formula (I-B):

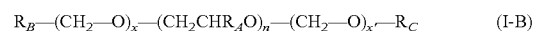
(I-B)

wherein both $R_B$ and $R_C$ are reactive groups comprising at least one heteroatom selected from oxygen and nitrogen different from the hydroxyl group, $R_A$ is a hydrogen atom or a $C_1$-$C_5$ alkyl group, x and x', equal to or different from each other, are independently 0 or 1, and n is an integer comprised between 2 and 1000, preferably between 5 and 200.

The polyoxyalkylene (POA) of formula (I) as defined above is preferably a polyoxyethylene (POE) complying with formula (I'):

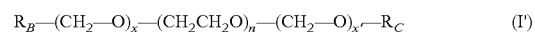
(I')

wherein at least one of $R_B$ and $R_C$ is a reactive group comprising at least one heteroatom selected from oxygen and nitrogen different from the hydroxyl group, the remaining, if any, being a $-[O]_z-CH_3$ alkyl group, wherein z is 0 or 1, x and x', equal to or different from each other, are independently 0 or 1, and n is an integer comprised between 2 and 1000, preferably between 5 and 200.

Very good results have been obtained with polyoxyethylenes (POEs) complying with formula (I-A) as defined above, wherein n is an integer comprised between 5 and 200.

The selection of the reactive group of the polyoxyalkylene (POA) of formula (I) as defined above is not particularly limited, provided that it is different from the hydroxyl group and it enables, under appropriate conditions, polycondensation and/or addition of the POA of formula (I) as defined above with the polymer (F) as defined above through one or more functional groups.

The reactive group of the POA of formula (I) as defined above typically enables polycondensation and/or addition of the POA of formula (I) as defined above with the polymer (F) as defined above through one or more functional groups selected from the group consisting of an ester group, an ether group and an urethane group.

The reactive group of the POA of formula (I) as defined above preferably comprises at least one functional group selected from a sulfonic ester group of formula $-[O]_z-SO_2R$, wherein R is a $C_1$-$C_8$ fluorinated or hydrogenated group optionally comprising one or more aromatic rings and z is 0 or 1, a carboxylic acid group, an epoxide functional group and an isocyanate functional group.

The reactive group of the POA of formula (I) as defined above is preferably selected from the group consisting of:
a sulfonic ester group of formula $-[O]_z-SO_2R$, wherein R is a $C_1$-$C_8$ fluorinated or hydrogenated group optionally comprising one or more aromatic rings and z is 0 or 1, preferably $-[O]_z-SO_2C_4F_9$ or $-[O]_z-SO_2-C_6H_4-CH_3$,
a carboxylic acid group,
an epoxide functional group, and
a hydrocarbon group comprising at least one isocyanate functional group of formula:

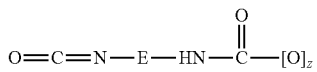

wherein E is a divalent hydrocarbon group, linear or branched, optionally comprising one or more aromatic or cycloaliphatic groups and/or one or more functional groups and z is 0 or 1.

The divalent hydrocarbon group E may be selected from the followings:

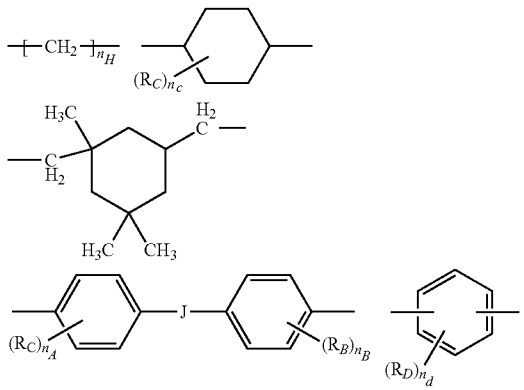

and mixtures thereof;
wherein:
$n_H$ is an integer from 1 to 12, preferably equal to 6;
J is a divalent bridging group selected from the followings: a single bond; a methylene group ($-CH_2-$); an oxygen atom ($-O-$); a $-C(CH_3)_2-$ group; a $-C(CF_3)_2-$ group; a $-SO_2-$ group; a $-C(O)-$ group; a hydrocarbon group which may comprise one or more functional groups;
each of $R_A$, $R_B$, $R_C$, $R_D$, equal or different at each occurrence, is independently a halogen atom (e.g. Cl, Br, F), a $C_1$-$C_6$ hydrocarbon group (e.g. methyl, ethyl), a substituent group like notably $-OR_{H'}$, $-NR_{H'}R_{H''}$, $-C(O)-R_{H'''}$, wherein $R_{H'}$, $R_{H''}$, $R_{H'''}$, $R_{H''''}$, equal to or different from each other, are independently at each occurrence a hydrogen atom or a $C_1$-$C_6$ hydrocarbon group;
$n_A$, $n_B$, $n_d$ are independently integers from 0 to 4;
$n_C$ is an integer from 0 to 10.

Non-limitative examples of suitable divalent hydrocarbon groups E include, notably, those derived from poly(ethylene adipate)-tolylene 2,4-diisocyanate, poly(propylene glycol)-tolylene 2,4-diisocyanate, hexamethylendiisocyanate, trimethylhexamethylenediisocyanate, isophoron diisocyanate, 4,4'-methylenebis(cyclohexylisocyanate), cyclohexyl-1,4-diisocyanate, 4,4'-methylenebis(phenylisocyanate) or its isomers, toluene 2,4-diisocyanate or isomers thereof, xylylene diisocyanate, naphthalene-1,5-diisocyanate, p-phenylen-diisocyanate.

Non-limitative examples of suitable polyoxyethylenes (POEs) of formula (I-A) include, notably, the followings:
(a) $RSO_2O-(CH_2CH_2O)_n-CH_3$, wherein R is a $C_1$-$C_5$ fluorinated or hydrogenated group optionally comprising one or more aromatic rings, preferably $-OSO_2C_4F_9$ or $-OSO_2-C_6H_4-CH_3$, and n is typically comprised between 10 and 60, having an average molecular weight comprised between 500 g/mol and 2500 g/mol;
(b) $CH_3O-(CH_2CH_2O)_n-CH_2COOH$, wherein n is typically comprised between 10 and 120, having an average molecular weight of from 500 g/mol to 5000 g/mol, preferably of 564 g/mol, 764 g/mol, 2014 g/mol or 5000 g/mol;
(c)

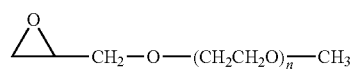

wherein n is typically comprised between 10 and 70, having an average molecular weight comprised between 500 g/mol and 3000 g/mol, preferably of 616 g/mol or 2100 g/mol;

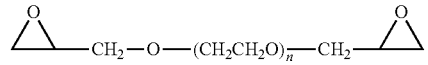

(d)
wherein n is typically comprised between 5 and 120, having an average molecular comprised between 400 g/mol and 5000 g/mol, preferably of 526 g/mol;
(e)

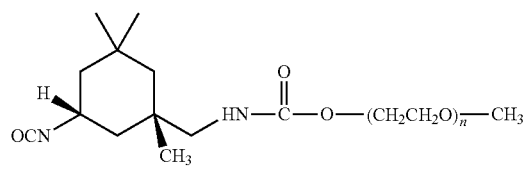

wherein n is typically comprised between 10 and 110, having an average molecular comprised between 600 g/mol and 4700 g/mol, preferably of 2451 g/mol.

By the term "fluorinated backbone", it is hereby intended to denote a fluoropolymer chain comprising recurring units derived from one or more fluorinated monomers and from one or more hydrogenated monomers, said recurring units being randomly distributed along the backbone chain.

The fluorinated backbone of the polymer (Fg) is preferably selected from the group consisting of:

(A) a fluorinated backbone comprising recurring units derived from a fluoropolymer [polymer ($F_1$)], said fluorinated backbone comprising recurring units derived from vinylidene fluoride (VDF), from at least one hydrogenated monomer and, optionally, from one or more fluorinated monomers different from VDF, said recurring units being randomly distributed along the fluorinated backbone, and (B) a fluorinated backbone comprising recurring units derived from a fluoropolymer [polymer ($F_2$)], said fluorinated backbone comprising recurring units derived from at least one hydrogenated monomer selected from ethylene, propylene and isobutylene, from a fluorinated monomer selected from tetrafluoroethylene (TFE), chlorotrifluoroethylene (CTFE) and mixtures thereof, and from at least one hydrogenated monomer, said recurring units being randomly distributed along the fluorinated backbone.

Should the polymer (F) in the process of the invention comprise recurring units derived from at least one fluorinated monomer and from at least one (meth)acrylic monomer [monomer (MA)] of formula (II) as defined above, the polymer (Fg) obtainable by the process of the invention typically comprises:

at least one fluorinated backbone, and
at least one pendant side chain linked to one or two fluorinated backbones of the polymer (Fg) through one or two —C(O)—O— functional groups (ester functional groups), said pendant side chain having formula:

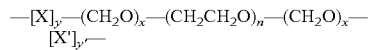

wherein X and X', equal to or different from each other, are independently bridging groups comprising at least one heteroatom selected from oxygen and nitrogen, x and x', equal to or different from each other, are independently 0 or 1, y and y', equal to or different from each other, are independently 0 or 1, and n' is an integer comprised between 2 and 1000, preferably between 5 and 200.

The pendant side chain of the polymer (Fg) is typically free from fluorine atoms.

The pendant side chain of the polymer (Fg) is preferably linked to one or two fluorinated backbones of said polymer (Fg) through one or two ester functional groups, said pendant side chain having formula:

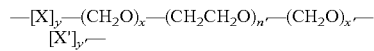

wherein X and X', equal to or different from each other, are independently bridging groups comprising at least one heteroatom selected from oxygen and nitrogen, x and x', equal to or different from each other, are independently 0 or 1, y and y', equal to or different from each other, are independently 0 or 1, and n' is an integer comprised between 2 and 1000, preferably between 5 and 200.

The pendant side chain of the polymer (Fg) is more preferably linked to one or two fluorinated backbones of said polymer (Fg) through one or two ester functional groups, said pendant side chain having either of formulae:

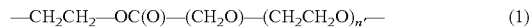 (1)

 (2)

 (3)

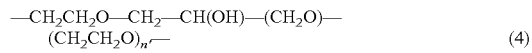 (4)

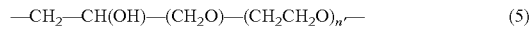 (5)

 (6)

wherein in formulae (1) to (6) n' is an integer comprised between 2 and 1000, preferably between 5 and 200 and in formula (6) E is a divalent hydrocarbon group, linear or branched, optionally comprising one or more aromatic or cycloaliphatic groups and/or one or more functional groups.

The polymer (Fg) preferably comprises, more preferably consists of:

at least one fluorinated backbone selected from the group consisting of:

(A) a fluorinated backbone comprising recurring units derived from a fluoropolymer [polymer ($F_1$)], said fluorinated backbone comprising recurring units derived from vinylidene fluoride (VDF), from at least one hydrogenated monomer and, optionally, from one or more fluorinated monomers different from VDF, said recurring units being randomly distributed along the fluorinated backbone, and (B) a fluorinated backbone comprising recurring units derived from a fluoropolymer [polymer ($F_2$)], said fluorinated backbone comprising recurring units derived from at least one hydrogenated monomer selected from ethylene, propylene and isobutylene, from a fluorinated monomer selected from tetrafluoroethylene (TFE), chlorotrifluoroethylene (CTFE) and mixtures thereof, and from at least one hydrogenated monomer, said recurring units being randomly distributed along the fluorinated backbone, and at least one pendant side chain linked to one or two fluorinated backbones of the polymer (Fg) through one or two ester functional group, said pendant side chain having either of formulae:

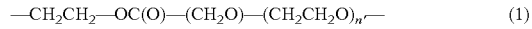 (1)

 (2)

 (3)

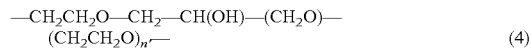 (4)

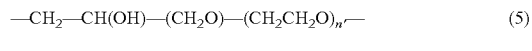 (5)

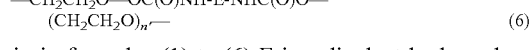 (6)

wherein in formulae (1) to (6) E is a divalent hydrocarbon group, linear or branched, optionally comprising one or more aromatic or cycloaliphatic groups and/or one or more functional groups and n' is an integer comprised between 2 and 1000, preferably between 5 and 200.

The Applicant thinks, without this limiting the scope of the invention, that the polyoxyalkylene is degraded under the process of the invention so that the grafted fluoropolymer thereby provided comprise pendant side chains comprising oxyalkylene recurring units of formula —CH$_2$CHR$_4$O— deriving therefrom.

Determination of the average weight percentage of the oxyalkylene recurring units of formula —CH$_2$CHR$_4$O as defined above in the grafted fluoropolymer [polymer (Fg)] of the invention, relative to the total weight of the polymer (Fg), can be performed by any suitable method. Mention can be notably made of NMR techniques, in particular $^1$H-NMR techniques, according to standard methods.

The process of the invention may be further carried out in the presence of at least one polyoxyalkylene (POA) of formula (III):

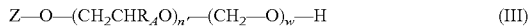

Z—O—(CH$_2$CHR$_4$O)$_{n'}$—(CH$_2$—O)$_w$—H     (III)

wherein Z is a hydrogen atom or a C$_1$-C$_5$ alkyl group, R$_{A'}$ is a hydrogen atom or a C$_1$-C$_5$ alkyl group, w is 0 or 1, and n' is an integer comprised between 2 and 1000, preferably between 5 and 200.

The polyoxyalkylene (POA) of formula (III) as defined above is typically selected from the group consisting of:

a monofunctional POA of formula (III-A):

Z—O—(CH$_2$CHR$_4$O)$_{n'}$—(CH$_2$—O)$_w$—H     (III-A)

wherein Z is a C$_1$-C$_5$ alkyl group, preferably a —CH$_3$ alkyl group, R$_{A'}$ is a hydrogen atom or a C$_1$-C$_5$ alkyl group, w is 0 or 1, and n' is an integer comprised between 2 and 1000, preferably between 5 and 200, and a difunctional POA of formula (III-B):

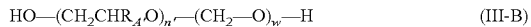

HO—(CH$_2$CHR$_4$O)$_{n'}$—(CH$_2$—O)$_w$—H     (III-B)

wherein R$_{A'}$ is a hydrogen atom or a C$_1$-C$_5$ alkyl group, w is 0 or 1, and n' is an integer comprised between 2 and 1000, preferably between 5 and 200.

The polyoxyalkylene (POA) of formula (III) as defined above is preferably a monofunctional POA of formula (III-A) as defined above.

Should at least one polyoxyalkylene (POA) of formula (III) as defined above be present in the process of the invention, the weight ratio of the polyoxyalkylene (POA) of formula (I) to the polyoxyalkylene (POA) of formula (III) is typically comprised between 10:90 and 90:10.

According to a first embodiment of the process for the manufacture of a polymer (Fg) of the invention, the process is carried out in liquid phase in the presence of one or more organic solvents (S). The process is carried out at temperatures typically comprised between 20° C. and 250° C. Temperatures between 20° C. and 150° C., preferably between 20° C. and 80° C. will be preferred.

Non-limitative examples of suitable organic solvents (S) include, notably, the followings:

aliphatic, cycloaliphatic or aromatic ether oxides, more particularly, diethyl oxide, dipropyl oxide, diisopropyl oxide, dibutyl oxide, methyltertiobutylether, dipentyl oxide, diisopentyl oxide, ethylene glycol dimethyl ether, ethylene glycol diethyl ether, ethylene glycol dibutyl ether benzyl oxide; dioxane, tetrahydrofuran, glycol ethers such as ethylene glycol monomethyl ether, ethylene glycol monoethyl ether, ethylene glycol monopropyl ether, ethylene glycol monoisopropyl ether, ethylene glycol monobutyl ether, ethylene glycol monophenyl ether, ethylene glycol monobenzyl ether, diethylene glycol monomethyl ether, diethylene glycol monoethyl ether, diethylene glycol mono-n-butyl ether, glycol ether esters such as ethylene glycol methyl ether acetate, ethylene glycol monoethyl ether acetate, ethylene glycol monobutyl ether acetate, alcohols such as methyl alcohol, ethyl alcohol, diacetone alcohol, ketones such as acetone, methylethylketone (MEK), methylisobutyl ketone, diisobutylketone, cyclohexanone, isophorone, and linear or cyclic esters such as isopropyl acetate, n-butyl acetate, methyl acetoacetate, dimethyl phthalate, g-butyrolactone;

linear or cyclic amides such as N,N-diethylacetamide, N,N-dimethylacetamide, dimethylformamide and N-methyl-2-pyrrolidone (NMP).

According to a second embodiment of the process for the manufacture of a polymer (Fg) of the invention, the process is carried out in molten phase at temperatures typically comprised between 100° C. and 300° C., preferably between 150° C. and 250° C., as a function of the melting point of the polymer (F). The process is typically carried out with no added organic solvents (S).

Melt compounders such as extruders, melt kneaders or other devices can be advantageously used to this aim.

The process of the invention is typically carried out with an equivalent ratio of the polyoxyalkylene (POA) of formula (I) as defined above to the polymer (F) as defined above comprised between 1.0 and 10.0, preferably between 1.0 and 4.0, more preferably between 1.0 and 3.0, even more preferably between 1.0 and 2.0.

It is understood that, in the process of the invention, the hydroxyl groups or the carboxylic acid groups of the polymer (F) as defined above are reacted by polycondensation and/or addition reaction with the reactive groups of the polyoxyalkylene (POA) of formula (I) as defined above thereby providing the grafted fluoropolymer [polymer (Fg)] of the invention comprising oxyalkylene recurring units of formula —CH$_2$CHR$_4$O— as defined above.

The equivalent ratio of the polyoxyalkylene (POA) of formula (I) as defined above to the polymer (F) as defined above is advantageously equal to or higher than 1.0.

Very good results have been obtained with an equivalent ratio of the polyoxyalkylene (POA) of formula (I) as defined above to the polymer (F) as defined above of from 1.0 to 2.0.

As this will be recognized by the skilled in the art, should a polycondensation reaction take place between the hydroxyl groups or the carboxylic acid groups of the polymer (F) as defined above and the reactive groups of the polyoxyalkylene (POA) of formula (I) as defined above, said polycondensation reaction commonly generates low molecular weight side products, which can be notably water or alcohol, as a function of the nature of the polyoxyalkylene (POA) of formula (I).

The average molar percentage of the fluorinated backbones of the polymer (F) that reacted with the reactive groups of the polyoxyalkylene (POA) of formula (I) as defined above is typically comprised between 10% and 99% by moles.

According to a first embodiment of the process of the invention, the process comprises reacting:

(A) at least one polymer (F) comprising at least one hydroxyl group, (B) at least one monofunctional polyoxyalkylene (POA) of formula (I-A) as defined above, wherein R$_B$ is a reactive group comprising at least one functional group selected from a sulfonic ester group of formula —OSO$_2$R, wherein R is a C$_1$-C$_8$ fluorinated or hydrogenated group optionally comprising one or more aromatic rings, a carboxylic acid group, an epoxide functional group and an isocyanate functional group, (C) optionally, in the presence of at least one catalyst, and (D) optionally, in the presence of at least one organic solvent (S).

This first embodiment of the invention is preferably carried out in liquid phase the presence of at least one organic solvent (S).

According to a first variant of this first embodiment of the process of the invention, at least one polymer (F) comprising at least one hydroxyl group is contacted with at least one POA of formula (I-A) comprising a reactive group $R_B$ comprising at least one sulfonic ester group of formula —$OSO_2R$, wherein R is a $C_1$-$C_8$ fluorinated or hydrogenated group optionally comprising one or more aromatic rings, preferably —$OSO_2C_4F_9$ or —$OSO_2$—$C_6H_4$—$CH_3$, in the presence of at least one organic solvent (S) and at least one catalyst.

The catalyst is typically selected from organic and inorganic bases. The catalyst is preferably an aliphatic tertiary amine, more preferably $Et_3N$.

According to a second variant of this first embodiment of the process of the invention, at least one polymer (F) comprising at least one hydroxyl group is contacted with at least one POA of formula (I-A) comprising a reactive group $R_B$ comprising at least one carboxylic acid group, in the presence of at least one organic solvent (S) and at least one catalyst.

The catalyst is typically selected from organic and inorganic acids, preferably from inorganic acids such as $H_2SO_4$.

According to a third variant of this first embodiment of the process of the invention, at least one polymer (F) comprising at least one hydroxyl group is contacted with at least one POA of formula (I-A) comprising a reactive group $R_B$ comprising at least one isocyanate functional group, in the presence of at least one organic solvent (S) and at least one catalyst.

The catalyst is typically selected from organic and inorganic bases such as tertiary amines, preferably 1,4-diazabicyclo[2.2.2]octane (DABCO), or Stannous t-butyl laurate.

According to a second embodiment of the process of the invention, the process comprises reacting:
(A) at least one polymer (F) comprising at least one carboxylic acid group,
(B) at least one polyoxyalkylene (POA) of formula (I) as defined above wherein at least one of $R_B$ and $R_C$ is a reactive group comprising at least one epoxide functional group, the remaining, if any, being a —$[O]_z$—$CH_3$ alkyl group, wherein z is 0 or 1,
(C) optionally, in the presence of at least one catalyst, and
(D) optionally, in the presence of at least one organic solvent (S).

This second embodiment of the invention is preferably carried out in molten phase.

Further, another object of the present invention is a fluoropolymer film made of a composition (F) comprising at least one polymer (Fg) of the invention.

The composition (F) is advantageously obtained by the process of the invention.

By the term "film", it is hereby intended to denote a dense film having a porosity of less than 5% by volume relative to the total volume of the film.

The film of the present invention is typically manufactured using techniques commonly known in the art.

Should the composition (F) be processed in liquid phase, in the presence of one or more organic solvents (S), the composition (F) is typically processed by coating and drying a fluoropolymer film onto a substrate.

The composition (F) is usually processed by casting, doctor blade coating, metering rod (or Meyer rod) coating, slot die coating, knife over roll coating or "gap" coating, and the like.

The choice of the substrate is not particularly limited, being understood that the film can be manufactured directly as a unitary assembly or can be manufactured by coating onto another support surface, from which said film can be detached and individualized.

The fluoropolymer film so obtained may then be post-treated by curing.

Drying can be performed under modified atmosphere, e.g. under an inert gas, typically exempt notably from moisture (water vapour content of less than 0.001% v/v), or can be performed under vacuum.

Drying can be performed at room temperature (about 25° C.) or at a temperature exceeding 25° C., this latter condition being generally preferred. The drying temperature will be selected so as to effect removal by evaporation of one or more organic solvents (S) from the fluoropolymer film.

Curing, if any, is carried out at temperatures typically comprised between 100° C. and 250° C., preferably between 120° C. and 200° C.

It is understood that, under drying and, optionally, curing conditions, the low molecular weight side products generated by polycondensation reaction, which can be notably water or alcohol, as a function of the nature of the polyoxyalkylene (POA) of formula (I), and one or more organic solvents (S) are at least partially removed from the film, possibly further promoting, by combined action of heat and side products removal, additional polycondensation.

Should the composition (F) be processed in molten phase, with no added organic solvents (S), the composition (F) is typically processed by melt-processing techniques.

The composition (F) is usually processed by extrusion through a die at temperatures generally comprised between 100° C. and 300° C., preferably between 100° C. and 250° C., to yield strands which are usually cut for providing pellets.

Twin screw extruders are preferred devices for accomplishing melt compounding of the composition (F).

Films can then be manufactured by processing the pellets so obtained through traditional film extrusion techniques.

The fluoropolymer film so obtained may then be post-treated by curing.

Curing is carried out at temperatures typically comprised between 100° C. and 250° C., preferably between 120° C. and 200° C.

It is understood that, under melt-processing and, optionally, curing conditions, the low molecular weight side products generated by polycondensation reaction, which can be notably water or alcohol, as a function of the nature of the polyoxyalkylene (POA) of formula (I), are at least partially removed from the fluoropolymer film, possibly further promoting, by combined action of heat and side products removal, additional polycondensation.

Still, another object of the present invention is a porous membrane made of a composition (F) comprising at least one polymer (Fg) of the invention.

The composition (F) is advantageously obtained by the process of the invention.

By the term "porous membrane", it is hereby intended to denote a membrane having a porosity comprised between 5% and 90%, preferably between 10% and 85% by volume relative to the total volume of the membrane.

The porous membrane of the invention is typically manufactured by at least one of irradiation, film expansion, template leaching, solution precipitation and electrospinning techniques.

The porous membrane of the invention is preferably manufactured by the solution precipitation technique.

According to the solution precipitation technique, a solution comprising the functional fluoropolymer of the invention or compositions thereof is precipitated into two phases, namely a solid, polymer-rich phase which forms the matrix of the membrane and a liquid, polymer-poor phase that forms the membrane pores. Polymer precipitation from this solution can be achieved in several ways, such as cooling, solvent evaporation, precipitation by immersion in a non-solvent, imbibition of a non-solvent from the vapour phase.

The porous membrane of the invention typically has a thickness comprised between 1 µm and 1000 µm.

The membrane of the invention can be under the form of a flat-sheet membrane or can be produced under the form of thin tubes or fibers to yield hollow-fiber membranes. Flat-sheet membranes are generally preferred when high fluxes are required. Hollow-fiber membranes are particularly preferred when compact modules with high surface areas are required.

Non-limitative examples of porous membranes which can be obtained using the polymer (Fg) of the invention and compositions (F) thereof include, notably, filtration membranes which can be used in the chemical processing industry in various separation processes, such as micro-filtration and ultra-filtration membranes, in particular porous hollow-fiber membranes for use in water filtration.

The porous membranes so obtained can also be used in biomedical applications, e.g. for haemodialysis, for controlled release of drugs, for artificial organs, such as kidney, lung and pancreas.

Should the disclosure of any patents, patent applications, and publications which are incorporated herein by reference conflict with the description of the present application to the extent that it may render a term unclear, the present description shall take precedence.

The invention will be now described in more detail with reference to the following examples whose purpose is merely illustrative and not limitative of the scope of the invention.

Raw Materials

Polymer (F-A): VDF-HEA copolymer (HEA: 0.7% by moles) having an equivalent weight of 9259 g/eq.

Polymer (F-B): VDF-AA copolymer (AA: 0.9% by moles) having an equivalent weight of 7184 g/eq.

POE-1:

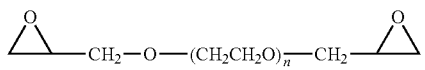

having an average molecular weight of 526 g/mol.

POE-2a:

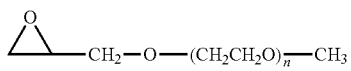

having an average molecular weight of 616 g/mol.

POE-2b:

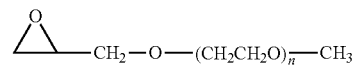

having an average molecular weight of 2100 g/mol.

POE-3a: HO—$(CH_2CH_2O)$—$CH_3$ having an average molecular weight of 2000 g/mol.

POE-3b: HO—$(CH_2CH_2O)$—$CH_3$ having an average molecular weight of 550 g/mol.

POE-4: $C_4F_9SO_2O$—$(CH_2CH_2O)$—$CH_3$ having an average molecular weight of 2282 g/mol.

POE-5:

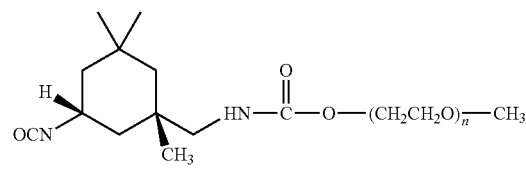

having an average molecular weight of 2451 g/mol.

Determination of weight percentage of the oxyalkylene recurring units in the grafted fluoropolymer Determination of weight percentage of the oxyalkylene recurring units in the grafted fluoropolymer was carried out using $^1$H-NMR technique.

About 20 mg of polymer were dissolved in 0.7 ml of hexadeuterodimethylsulfoxide. The $^1$H-NMR spectrum revealed signal related to —$CH_2CHR_4O$— recurring units at about 3.5-3.6 ppm near to the —$CH_2$— moieties of the fluorinated backbone of the polymer (at about 2.5 and 3 ppm).

The average weight percentage of the oxyalkylene recurring units relative to the total weight of the grafted fluoropolymer was determined by the following equation: wherein:

% w/w=$(I \times MW)_{oxyalkylene\ units}/[(I \times MW)(\text{oxyalkylene units})+(I \times MW)_{polymer\ backbone\ units}] \times 100$ I is the intensity, normalized to one hydrogen, of the integral of the recurring unit;

MW is the molecular weight of the recurring units.

Measurement of Porosity

Porosity of a membrane is a measure of the volume of the pores by the total volume of the membrane.

The porosities were measured using isopropyl alcohol as wetting fluid according to the procedure notably described in SMOLDERS, K., at al. Terminology for Membrane Distillation. *Desalination*. 1989, vol. 72, p. 249-262.

Measurement of Water Permeability

The water permeability was measured with a dead-end stainless steel apparatus applying an atmospheric pressure of 1 bar. The surface area of the membranes was about 11 cm$^2$.

The water permeability value is a measure of the hydrophilic properties of the polymer. As the water permeability value increases, the hydrophilic properties of the polymer are increased.

Measurement of Contact Angle

The contact angle towards water was evaluated at 25° C. by using Dataphysics OCA-20 apparatus, according to ASTM D 5725-99. Measures were taken on flat (dense) surfaces and porous membranes using drops having a volume of 2 µL.

The contact angle value towards water is a measure of the hydrophilic properties of the polymer. A material is considered hydrophobic when the contact angle of a water droplet on its surface is higher than 90°. As the contact angle towards water decreases, the hydrophilic properties of the polymer are increased.

EXAMPLE 1—Manufacture of Grafted Fluoropolymer (1)

60 g of polymer (F-A) and 4 g of POE-1 were mixed in a roll mill for 30 minutes and then fed to Brabender 50 EHT mixer. The test conditions were the followings: temperature=240° C., mixing time=7 minutes, rotation speed=40 rpm.

EXAMPLE 2—Manufacture of Grafted Fluoropolymer (2)

The same procedure as detailed under Example 1 was followed but setting a temperature of 220° C. and a mixing time of 20 minutes.

The weight amount of oxyethylene recurring units of formula —$CH_2CH_2O$— was 1.4% by weight, relative to the total weight of the grafted fluoropolymer.

EXAMPLE 3—Manufacture of Grafted Fluoropolymer (3)

55 g of polymer (F-A) and 10 g of POE-2a were mixed in a roll mill for 30 minutes and then fed to Brabender 50 EHT mixer. The test conditions were the followings: temperature=230° C., mixing time=20 minutes, rotation speed=40 rpm.

EXAMPLE 4A)—Manufacture of POE-4

In a dried 3-necked round-bottom flask equipped with a reflux condenser, a dripping funnel, a thermometer and a magnetic stirrer, 5.00 g (2.5 meq) of POE-3a were dissolved in 40 ml of dichloromethane under inert atmosphere. The mixture was heated to 40° C. and a mixture of 0.38 g (3.75 meq) of $Et_3N$, 2.27 g (7.5 meq) of $C_4F_9SO_2F$ in 10 ml of dichloromethane were dripped during 15 minutes and the reaction mixture was stirred at 1000 rpm and 60° C. for 5 hours.

The crude reaction mixture was first washed 3 times with 1,1,2-trichlorotrifluoroethane and then stripped from its solvent and unreacted $Et_3N$ and $C_4F_9SO_2F$. POE-4 was recovered as a solid with a yield of 85% by moles and a purity of 99% by moles, as measured by $^{19}$F-NMR and $^1$H-NMR techniques.

EXAMPLE 4B)—Manufacture of Grafted Fluoropolymer (4)

5 g of polymer (F-A) were dissolved in 30 ml of N-methyl-2-pyrrolidone (NMP) at 60° C. This homogeneous solution was first cooled to room temperature and then 14 equivalents of POE-4 and 14 equivalents of anhydrous $Et_3N$ were added. The reaction mixture was stirred for 10 hours at 60° C. The homogeneous reaction mixture so obtained was heated to 80° C. and stirred for 10 hours.

A grafted fluoropolymer was isolated by precipitating it from NMP with 600 ml of distilled water and washed on a Buchner filtering funnel with an additional 600 ml of distilled water. The functional fluoropolymer was then dried in an oven at 60° C. and 10 mm Hg of residual pressure for 5 hours.

EXAMPLE 5A)—Manufacture of POE-5

In a dried 3-necked round-bottom flask equipped with a reflux condenser, a dripping funnel, a thermometer and a magnetic stirrer, 5.00 g (2.5 meq) of POE-3a were dissolved in 40 ml of anhydrous methylethylketone (MEK) under inert atmosphere. The mixture was heated to 50° C. and a catalytic amount (0.1% by moles vs. POE-3a) of Stannous t-butyl laurate catalyst was added thereto. 2.78 g (12.5 meq) of isophoron diisocyanate were dripped during 15 minutes and the reaction mixture was stirred at 1000 rpm and 60° C. for 2 hours.

The crude reaction mixture was stripped from its solvent and washed 3 times with 1,1,2-trichlorotrifluoroethane. POE-5 was recovered as a fine white powder with a yield of 75% by moles and a purity of 96% by moles, as measured by $^1$H-NMR.

EXAMPLE 5B)—Manufacture of Grafted Fluoropolymer (5)

2.0 grams of polymer (F-A) were dissolved in 16 ml of MEK at 80° C. and placed in a previously dried 3-necked round-bottomed flask equipped with a reflux condenser, a dripping funnel, a thermometer and a magnetic stirrer. 1.20 g of POE-5 (0.49 mmol) and a catalytic amount (0.1% by moles vs. POE-5) of Stannous t-butyl laurate catalyst previously dissolved in 10 ml of MEK were dripped during 15 minutes. A clear homogeneous solution was obtained that was stirred at 75° C. and 800 rpm for 10 hours. The crude mixture was then washed with 500 ml of luke-warm (30° C.) distilled water in order to eliminate MEK and unreacted POE-5. The resulting polymer was dried in a heating oven at 50° C. and 0.02 residual mbar for 8 hours, thus obtaining 2.5 g of a filamentous white polymeric solid. Conversion was 100% by moles, based on FT-IR quantitative calculations on the residual —NCO stretching band employing the —$CH_2$— and —$CH_3$ stretching bands as internal standard.

EXAMPLE 6—Manufacture of Grafted Fluoropolymer (6)

60 g of polymer (F-B) and 4 g of POE-2b were mixed in a roll mill for 30 minutes and then fed to Brabender 50 EHT mixer. The test conditions were the followings: temperature=230° C., mixing time=20 minutes, rotation speed=40 rpm.

EXAMPLE 7—Manufacture of Grafted Fluoropolymer (7)

60 g of polymer (F-B), 2 g of POE-1 and 6 g of POE-3b were mixed in a roll mill for 30 minutes and then fed to Brabender 50 EHT mixer. The test conditions were the followings: temperature=230° C., mixing time=20 minutes, rotation speed=40 rpm.

The weight amount of oxyethylene recurring units of formula —$CH_2CH_2O$—was 1.45% by weight, relative to the total weight of the grafted fluoropolymer.

COMPARATIVE EXAMPLE 1

The same procedure as detailed under Example 3 was followed but using only 60 g of polymer (F-A) having a contact angle towards water of 90°.

COMPARATIVE EXAMPLE 2

60 g of polymer (F-A) and 4 g of POE-1 were mixed in a roll mill for 30 minutes. The blend so obtained was not fed to the Brabender 50 EHT mixer.

COMPARATIVE EXAMPLE 3

The same procedure as detailed under Example 3 was followed but using only 60 g of polymer (F-B) having a contact angle towards water of 90°.

Manufacture of Porous Membranes

Flat-sheet membranes were prepared using the phase inversion method as follows: dope solutions were prepared dissolving the fluoropolymer compositions (18% by weight) in NMP (82% by weight) for one day at room temperature. Before membrane casting, the solutions were ultrasonicated for 30 minutes to eliminate bubbles. An appropriate amount of the dope was casted on a glass plate (gate opening=250 mm) and immediately immersed in a bath to induce phase separation. The coagulation bath consisted of deionized water for Examples 1 to 5 and Comparative Examples 1 and 2. The coagulation bath consisted of a 70:30 by weight mixture of deionized water and isopropanol for Examples 6 and 7 and Comparative Example 3. The coagulation bath was kept at 25° C. When the membranes were fully solidified, they were taken out and rinsed in deionized water several times in order to remove the remaining solvent.

Washing Procedure

In order to clean the fluoropolymer compositions from unreacted species (and residual traces of solvent which could disturb the analytical measurements) the following procedure was adopted:

1. Preparation of solution in NMP with a concentration of 10% by weight.
2. Casting of said solution (gate thickness=200 micron) and immediate immersion in pure water to induce phase separation.
3. Transferring and storing the flat sheet membranes in an another deionized water bath which was refreshed frequently for one night.
4. Cutting of D=47 mm items and fluxing on each of them a volume of 0.5 liters of pure water in a permeability holder.
5. Storing of these items for another night in a deionized water bath and successive drying in a vacuum oven at 35° C. for some hours.

For the grafted fluoropolymers prepared according to Examples 1 to 7, this procedure (points 1 to 5) was repeated three times to assure a progressive removal of free polyoxyalkylenes in the polymer matrix. After each step the samples were analyzed by FT-IR and $^1$H-NMR techniques.

FT-IR spectroscopic analyses of washed films of the grafted fluoropolymers prepared according to Examples 1 to 7 showed ester bands at 1730-1740 cm$^{-1}$.

The amount of oxyalkylene recurring units of formula —CH$_2$CHR$_4$O— in the grafted fluoropolymers prepared according to Examples 1 to 7 was determined by $^1$H-NMR technique as detailed above. The weight amount of oxyalkylene recurring units of formula —CH$_2$CHR$_4$O— was measured relative to the total weight of the grafted fluoropolymer.

As shown in Table 1 here below, the water permeability values of the membranes obtained from the grafted fluoropolymers prepared according to Examples 1, 3 and 6 are significantly higher than those of membranes obtained using polymers (F) as such or blends of these polymers (F) with polyoxyalkylenes such as polyoxyethylenes.

Also, the contact angle value towards water of the grafted fluoropolymer prepared according to Example 4b) is significantly lower than that of polymer (F) as such.

TABLE 1

| | POE [% wt.] | Water permeability [L/h × m2] | Contact angle [°] | Porosity [%] | Thickness [µm] |
|---|---|---|---|---|---|
| Ex. 1 | 1.1 | 428 | — | 82.7 | 147 |
| Ex. 3 | 0.2 | 481 | — | 81.0 | 149 |
| Ex. 4 | 5.8 | — | 69.9 | — | — |
| Ex. 6 | 1.2 | 375 | — | 74.0 | 70 |
| C. Ex. 1 | — | 239 | 90.0 | 80.4 | 152 |
| C. Ex. 2 | — | 232 | — | 82.5 | 148 |
| C. Ex. 3 | — | 72 | — | 75.9 | 87 |

The invention claimed is:

1. A process for the manufacture of a grafted fluoropolymer [polymer (Fg)], said process comprising reacting:
   (A) at least one fluoropolymer comprising at least one functional group selected from the group consisting of a hydroxyl group and a carboxylic acid group [polymer (F)], and
   (B) at least one polyoxyalkylene (POA) of formula (I):

$$R_B—(CH_2—O)_x—(CH_2CHR_4O)_n—(CH_2—O)_{x'}—R_C \quad (I)$$

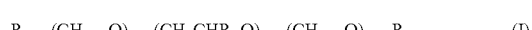

wherein at least one of $R_B$ and $R_C$ is a reactive group comprising at least one heteroatom selected from oxygen and nitrogen wherein the reactive group is not a hydroxyl group, and wherein the remaining of $R_B$ and $R_C$, if any, are selected from —[O]$_z$—CH$_3$ alkyl groups, wherein z is 0 or 1, $R_4$ is a hydrogen atom or a $C_1$-$C_5$ alkyl group, x and x', equal to or different from each other, are independently 0 or 1, and n is an integer comprised between 2 and 1000,
   (C) optionally, in the presence of at least one catalyst, and
   (D) optionally, in the presence of at least one organic solvent (S).

2. The process according to claim 1, wherein polymer (F) comprises recurring units derived from at least one fluorinated monomer and from at least one hydrogenated monomer comprising at least one functional group selected from the group consisting of a hydroxyl group and a carboxylic acid group [monomer (H)].

3. The process according to claim 2, wherein monomer (H) is a (meth)acrylic monomer [monomer (MA)] of formula (II):

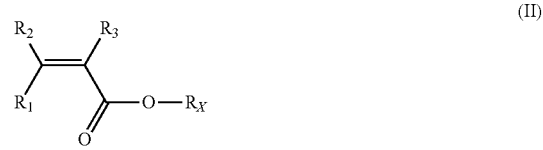

wherein:
   $R_1$, $R_2$ and $R_3$, equal to or different from each other, are independently selected from a hydrogen atom and a $C_1$-$C_3$ hydrocarbon group, and
   $R_X$ is a hydrogen atom or a $C_1$-$C_5$ hydrocarbon group comprising at least one hydroxyl group.

4. The process according to claim 3, wherein monomer (H) is acrylic acid (AA) or hydroxyethyl acrylate (HEA).

5. The process according to claim 1, wherein polymer (F) is selected from the group consisting of:
- a fluoropolymer [polymer ($F_1$)] comprising recurring units derived from vinylidene fluoride (VDF), from at least one monomer (MA) of formula (II) and, optionally, from one or more fluorinated monomers different from VDF, and
- a fluoropolymer [polymer ($F_2$)] comprising recurring units derived from at least one hydrogenated monomer selected from ethylene, propylene and isobutylene, from a fluorinated monomer selected from tetrafluoroethylene (TFE), chlorotrifluoroethylene (CTFE) and mixtures thereof, and from at least one monomer (MA) of formula (II):

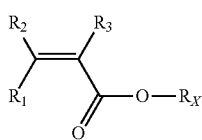 (II)

wherein:
- $R_1$, $R_2$ and $R_3$, equal to or different from each other, are independently selected from a hydrogen atom and a $C_1$-$C_3$ hydrocarbon group, and
- $R_X$ is a hydrogen atom or a $C_1$-$C_5$ hydrocarbon group comprising at least one hydroxyl group.

6. The process according to claim 1, wherein polymer (F) is a polymer ($F_1$) comprising:
(a') at least 60% by moles of vinylidene fluoride (VDF);
(b') optionally, from 0.1% to 15% by moles of a fluorinated monomer selected from vinylfluoride ($VF_1$), chlorotrifluoroethylene (CTFE), hexafluoropropene (HFP), tetrafluoroethylene (TFE), trifluoroethylene (TrFE), perfluoromethylvinylether (PMVE) and mixtures therefrom; and
(c') from 0.01% to 20% by moles of at least one monomer (MA) of formula (II):

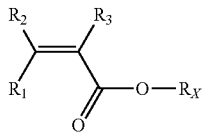 (II)

wherein:
- $R_1$, $R_2$ and $R_3$, equal to or different from each other, are independently selected from a hydrogen atom and a $C_1$-$C_3$ hydrocarbon group, and
- $R_x$ is a hydrogen atom or a $C_1$-$C_5$ hydrocarbon group comprising at least one hydroxyl group.

7. The process according to claim 6, wherein polymer (F) is a polymer ($F_1$) comprising:
(a') at least 85% by moles of vinylidene fluoride (VDF);
(b') optionally, from 0.1% to 10% by moles of a fluorinated monomer selected from vinylfluoride ($VF_1$), chlorotrifluoroethylene (CTFE), hexafluoropropene (HFP), tetrafluoroethylene (TFE), trifluoroethylene (TrFE), perfluoromethylvinylether (PMVE) and mixtures therefrom; and
(c') from 0.1% to 10% by moles of at least one monomer (MA) of formula (II).

8. The process according to claim 1, wherein the polyoxyalkylene (POA) of formula (I) is selected from the group consisting of:
a monofunctional POA of formula (I-A):

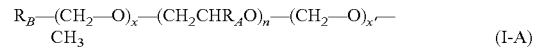 (I-A)

wherein $R_B$ is a reactive group comprising at least one heteroatom selected from oxygen and nitrogen wherein the reactive group is not a hydroxyl group, $R_A$ is a hydrogen atom or a $C_1$-$C_5$ alkyl group, x and x', equal to or different from each other, are independently 0 or 1, and n is an integer comprised between 2 and 1000, and a difunctional POA of formula (I-B):

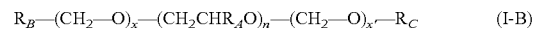 (I-B)

wherein both $R_B$ and $R_C$ are reactive groups comprising at least one heteroatom selected from oxygen and nitrogen wherein the reactive group is not a hydroxyl group, $R_A$ is a hydrogen atom or a $C_1$-$C_5$ alkyl group, x and x', equal to or different from each other, are independently 0 or 1, and n is an integer comprised between 2 and 1000.

9. The process according to claim 1, wherein the polyoxyalkylene (POA) of formula (I) is a polyoxyethylene (POE) complying with formula (I'):

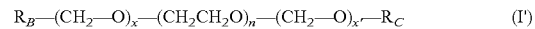 (I')

wherein at least one of $R_B$ and $R_C$ is a reactive group comprising at least one heteroatom selected from oxygen and nitrogen wherein the reactive group is not a hydroxyl group, and wherein the remaining of $R_B$ and $R_C$, if any, are selected from —[O]$_z$—$CH_3$ alkyl groups, wherein z is 0 or 1, x and x', equal to or different from each other, are independently 0 or 1, and n is an integer comprised between 2 and 1000.

10. The process according to claim 1, wherein at least one reactive group of the POA of formula (I) is selected from the group consisting of:
- a sulfonic ester group of formula —[O]$_z$—$SO_2$R, wherein R is a $C_1$-$C_8$ fluorinated or hydrogenated group optionally comprising one or more aromatic rings and z is 0 or 1,
- a carboxylic acid group,
- an epoxide functional group, and
- a hydrocarbon group comprising at least one isocyanate functional group of formula:

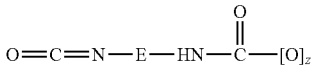

wherein E is a divalent hydrocarbon group, linear or branched, optionally comprising one or more aromatic or cycloaliphatic groups and/or one or more functional groups and z is 0 or 1.

11. The process according to claim 1, wherein the equivalent ratio of the polyoxyalkylene (POA) of formula (I) to the polymer (F) is comprised between 1.0 and 10.0.

12. The process according to claim 11, wherein the equivalent ratio of the polyoxyalkylene (POA) of formula (I) to the polymer (F) is comprised between 1.0 and 2.0.

13. The process according to claim 1, said process being further carried out in the presence of at least one polyoxyalkylene (POA) of formula (III):

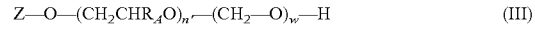 (III)

wherein Z is a hydrogen atom or a $C_1$-$C_5$ alkyl group, $R_{A'}$ is a hydrogen atom or a $C_1$-$C_5$ alkyl group, w is 0 or 1, and n' is an integer comprised between 2 and 1000.

14. The process according to claim 1, wherein the process is carried out in liquid phase in the presence of one or more organic solvents (S).

15. The process according to claim 1, wherein the process is carried out in molten phase.

16. The process according to claim 1, wherein n is an integer comprised between 5 and 200.

17. A fluoropolymer composition [composition (F)] comprising at least one grafted fluoropolymer [polymer (Fg)], said polymer (Fg) comprising:
  at least one fluorinated backbone selected from the group consisting of:
  (A) a fluorinated backbone comprising recurring units derived from a fluoropolymer [polymer ($F_1$)], said fluorinated backbone comprising recurring units derived from vinylidene fluoride (VDF), from at least one hydrogenated monomer comprising at least one functional group selected from the group consisting of a hydroxyl group and a carboxylic acid group [monomer (H)] and, optionally, from one or more fluorinated monomers different from VDF, said recurring units being randomly distributed along the fluorinated backbone, and
  (B) a fluorinated backbone comprising recurring units derived from a fluoropolymer [polymer ($F_2$)], said fluorinated backbone comprising recurring units derived from at least one hydrogenated monomer selected from ethylene, propylene and isobutylene, from a fluorinated monomer selected from tetrafluoroethylene (TFE), chlorotrifluoroethylene (CTFE) and mixtures thereof, and from at least one hydrogenated monomer comprising at least one functional group selected from the group consisting of a hydroxyl group and a carboxylic acid group [monomer (H)], said recurring units being randomly distributed along the fluorinated backbone, and
  at least one pendant side chain linked to one or two fluorinated backbones of the polymer (Fg) through one or two functional groups, said pendant side chain having formula:

wherein X and X', equal to or different from each other, are independently bridging groups comprising at least one heteroatom selected from oxygen and nitrogen, or one of X or X' is a —[O]$_z$—CH$_3$ group wherein z is 0 or 1, $R_A$ is a hydrogen atom or a $C_1$-$C_5$ alkyl group, x and x', equal to or different from each other, are independently 0 or 1, y and y', equal to or different from each other, are independently 0 or 1, and n' is an integer comprised between 2 and 1000.

18. The fluoropolymer composition according to claim 17, wherein said fluoropolymer composition is obtained by reacting:
  (A) at least one fluoropolymer comprising at least one functional group selected from the group consisting of a hydroxyl group and a carboxylic acid group [polymer (F)], and
  (B) at least one polyoxyalkylene (POA) of formula (I):

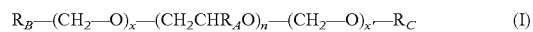

wherein at least one of $R_B$ and $R_C$ is a reactive group comprising at least one heteroatom selected from oxygen and nitrogen wherein the reactive group is not a hydroxyl group, and wherein the remaining of $R_B$ and $R_C$, if any, are selected from —[O]$_z$—CH$_3$ alkyl groups, wherein z is 0 or 1, $R_A$ is a hydrogen atom or a $C_1$-$C_5$ alkyl group, x and x', equal to or different from each other, are independently 0 or 1, and n is an integer comprised between 2 and 1000
  (C) optionally, in the presence of at least one catalyst, and
  (D) optionally, in the presence of at least one organic solvent (S).

19. The fluoropolymer composition according to claim 17, wherein at least one pendant side chain of the polymer (Fg) is linked to one or two fluorinated backbones of the polymer (Fg) through one or two ester functional group, said pendant side chain having one of the following formulae:

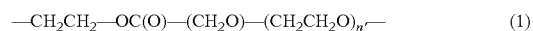

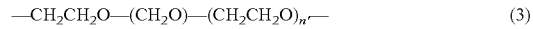

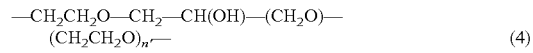

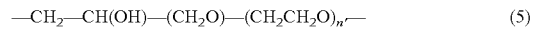

wherein n' is an integer comprised between 2 and 1000 and E is a divalent hydrocarbon group, linear or branched, optionally comprising one or more aromatic or cycloaliphatic groups and/or one or more functional groups.

20. A process for the manufacture of a porous membrane, said process comprising:
  processing the fluoropolymer composition [composition (F)] according to claim 17 thereby providing a fluoropolymer film, and
  processing the fluoropolymer film thereby providing a porous membrane.

* * * * *